(12) United States Patent
Morea et al.

(10) Patent No.: US 9,813,160 B2
(45) Date of Patent: Nov. 7, 2017

(54) METHOD OF EQUALIZING AN OPTICAL TRANSMISSION SIGNAL

(71) Applicant: Alcatel Lucent, Boulogne Billancourt (FR)

(72) Inventors: Annalisa Morea, Vimercate (IT); Jeremie Renaudier, Nozay (FR); Amirhossein Ghazisaeidi, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/127,806

(22) PCT Filed: Feb. 3, 2015

(86) PCT No.: PCT/EP2015/052134
§ 371 (c)(1),
(2) Date: Sep. 21, 2016

(87) PCT Pub. No.: WO2015/144346
PCT Pub. Date: Oct. 1, 2015

(65) Prior Publication Data
US 2017/0117967 A1    Apr. 27, 2017

(30) Foreign Application Priority Data

Mar. 28, 2014 (EP) ..................................... 14305452

(51) Int. Cl.
*H04B 10/294* (2013.01)
*H04J 14/02* (2006.01)
*H04B 10/2507* (2013.01)

(52) U.S. Cl.
CPC ..... *H04B 10/2941* (2013.01); *H04B 10/2507* (2013.01); *H04J 14/0221* (2013.01); *H04J 14/0298* (2013.01)

(58) Field of Classification Search
CPC ............. H04B 10/2941; H04B 10/2507; H04J 14/0221; H04J 14/0298
(Continued)

(56) References Cited

U.S. PATENT DOCUMENTS 6,559,984 B1 *  5/2003  Lee ..................... H04B 10/0771
                                                       398/5
7,542,675 B1 *  6/2009  Graves ............... H04Q 11/0005
                                                       398/45
(Continued)

FOREIGN PATENT DOCUMENTS

| EP | 1076434 | 2/2001 |
| EP | 1161115 | 12/2001 |
| WO | 2012097401 | 7/2012 |

*Primary Examiner* — Oommen Jacob
(74) *Attorney, Agent, or Firm* — Patti & Malvone Law Group, LLC (57) ABSTRACT

Proposed is a method of equalizing an optical signal that has an overall bandwidth formed on a number of adjacent spectral slots, wherein the signal comprises a set of non-overlapping subcarrier signals. A distribution of the subcarrier signals onto the slots is such, that at least one slot is occupied by more than one subcarrier signal. The signal is received and amplified. Respective power levels are measured for the subcarrier signals. Distribution data is provided, which indicates the distribution of the subcarrier signals onto the spectral slots. Power level data is provided, which indicates for the spectral slots respective desired power levels. For the spectral slots respective attenuation values are derived, using the measured power levels, the distribution data and the power level data. Finally, the optical transmission signal is attenuated within the spectral slots individually, using the derived attenuation values.

8 Claims, 4 Drawing Sheets

(58) Field of Classification Search
USPC .................................... 398/160, 157, 140
See application file for complete search history.

(56) References Cited

U.S. PATENT DOCUMENTS

| | | | |
|---|---|---|---|
| 9,614,617 B2* | 4/2017 | Lowery | H04B 10/2563 |
| 2002/0060990 A1* | 5/2002 | Bohnke | H04B 7/0613 |
| | | | 370/270 |
| 2007/0201344 A1* | 8/2007 | Miyabayashi | H04L 27/2608 |
| | | | 370/203 |
| 2014/0099116 A1* | 4/2014 | Bai | H04B 10/532 |
| | | | 398/76 |
| 2015/0037034 A1* | 2/2015 | Renaudier | H04L 1/0035 |
| | | | 398/65 |
| 2015/0117341 A1* | 4/2015 | Ohwatari | H04L 5/0032 |
| | | | 370/329 |
| 2017/0117967 A1* | 4/2017 | Morea | H04B 10/2941 |

* cited by examiner

METHOD OF EQUALIZING AN OPTICAL TRANSMISSION SIGNAL

FIELD OF THE INVENTION

The invention relates to a method of equalizing an optical transmission signal and an optical network node for equalizing an optical transmission signal.

BACKGROUND

For the purpose of optical data transmission an optical signal may be modulated in its phase and/or amplitude. An optical carrier signal, which has a respective wavelength bandwidth, may be modulated in accordance with a specific modulation scheme having a respective order. Due to the increase of data traffic, modulation schemes or modulation formats of higher order may be used in order to increase the amount of transported information for a given carrier signal. With the introduction of coherent data transmission using coherent detection at a receiving side, a variety of modulation schemes becomes available. The optical carrier signal modulated at the transmitting side is detected at a receiving side in a coherent reception scheme using a local oscillator signal that corresponds to the wavelength of the received optical signal. Other multiplexing methods, such as polarisation multiplexing, may be deployed for furthermore increasing the overall data rate.

An advantage of coherent data transmission is the possibility of creating optical channels consisting of multiple carrier signals, such that a narrow spectral occupancy is achieved. In such a technology called flexgrid, the spacing of the optical channel may consist of spectral slots having a bandwidth of 12.5 GHz, wherein an overall slot of for example 50 GHz may be reserved for one single optical carrier signal exploiting the bandwidth of this overall slot. In other words, according to this technology a bandwidth varied within steps of 12.5 GHz may be allocated by an optical carrier signal.

It is a drawback of the so called flex grid solution, that this solution needs filtering devices at the optical network nodes that are compliant with the specific spacing of this specific grid. For example, different works in the literature have demonstrated that filters for bandwidths narrower than 35 GHz may not show satisfying performance in terms of insertion loss and profile sharpness. Therefore, applying an individual optical filter to an individual carrier signal of a bandwidth smaller than 35 GHz may be cumbersome.

Figure 1:
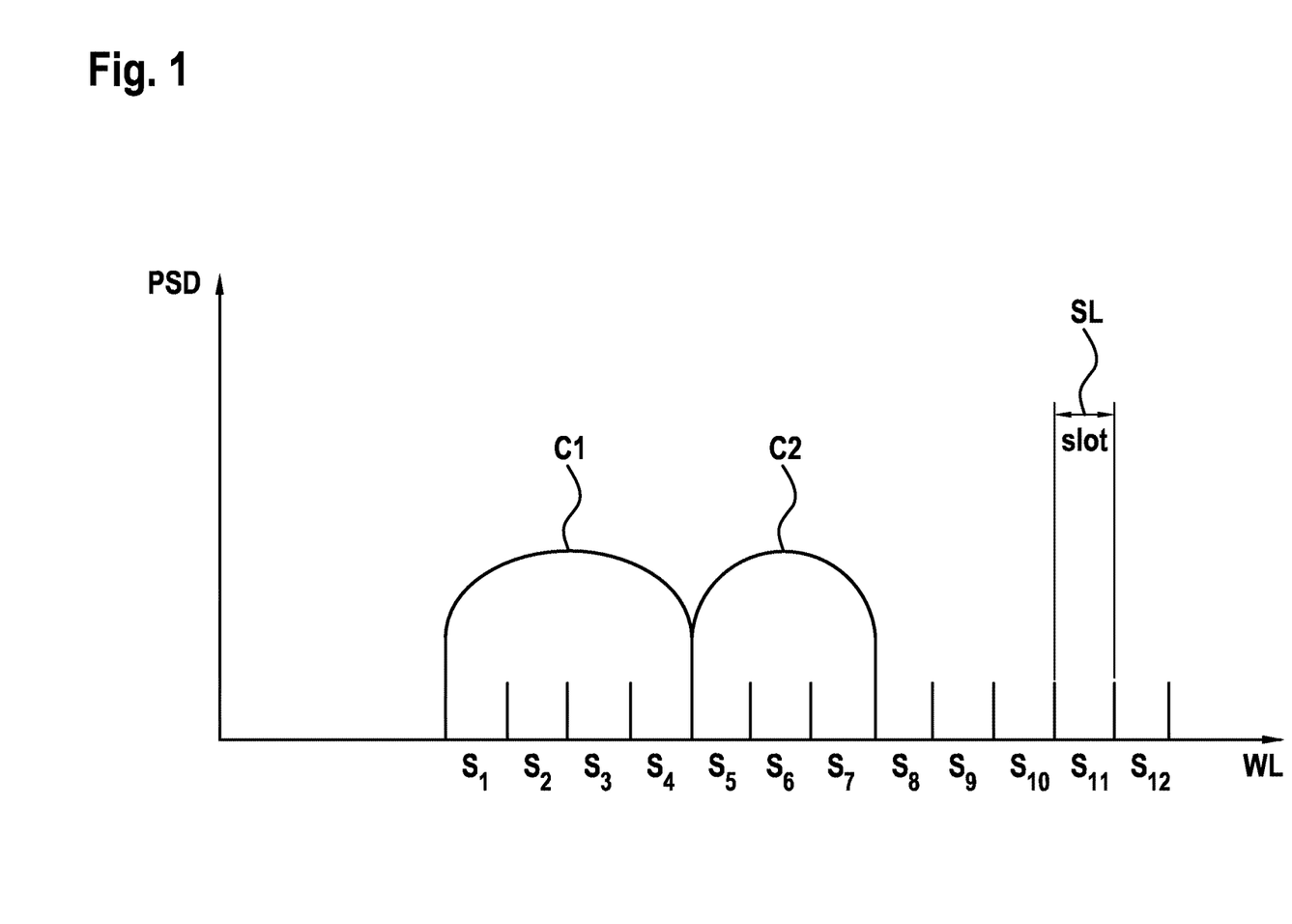
FIG. 1 shows a distribution of carrier signals onto spectral slots according to the prior art.

FIG. 1 shows a power spectral density PSD of two carrier signals C1, C2 over the wavelength WL for a slot spacing given by slots S1, . . . , S12. The bandwidth of the different slots SL is equal for all slots. The two signals C1 and C2 may form a so called super-channel signal. A super-channel signal is a signal that is transmitted in an optical network from a same starting and transmitting node along same optical links, preferably in the form of same optical fibres and same intermediate network nodes, to a same destination node.

As it is evident from FIG. 1, a super-channel signal formed by a number of carrier signals C1, C2 may be given by a distribution of the carrier signals C1, C2 onto the slots S1, . . . , S12, such that the carrier signal C1 is distributed onto a number of slots S1, . . . , S4 that are not occupied by any other carrier signal C2. In other words, a single slot S1, . . . , S12 is occupied by at most one carrier signal.

Sticking to the grid shown in FIG. 1, the different carrier signals C1 and C2 may be received at a network node and may then also be equalized, e.g. attenuated, in their powers by an equalization method in which each slot equalization affects only one of the carrier signals.

SUMMARY

Proposed is a method for equalizing an optical transmission signal. The optical transmission signal signal has an overall bandwidth formed on a number of adjacent spectral slots. The optical transmission signal comprises a set of non-overlapping subcarrier signals, wherein a distribution of the subcarrier signals onto the spectral slots is such, that at least one spectral slot is occupied by more than one subcarrier signal.

The method comprises different steps, carried out at a network node.

The optical transmission signal is received. Furthermore, the signal is amplified.

Respective power levels are measured for the subcarrier signals.

Distribution data is provided, which indicates the distribution of the subcarrier signals onto the spectral slots.

Power level data is provided, which indicates for the spectral slots respective desired power levels.

For the spectral slots respective attenuation values are derived, using the measured power levels, the distribution data and the power level data.

Finally, the optical transmission signal is attenuated within the spectral slots individually, using the derived attenuation values.

Preferably, the distribution data indicates a predefined distribution of the subcarrier signals' respective power levels onto the spectral slots.

Preferably, the optical transmission signal is a super-channel signal formed by the subcarrier signals.

Preferably, the spectral slots have same respective bandwidths.

Proposed is furthermore a network node for equalizing the optical transmission signal. The node comprises
- an optical interface, operable to receive the optical transmission signal,
- an optical amplifier, operable to amplify the optical transmission signal,
- an optical spectrum analyzer, operable to measure for the subcarrier signals respective power levels,
- a network interface, operable to provide distribution data indicating the distribution of the subcarrier signals onto the spectral slots, and furthermore operable to provide power level data indicating for the spectral slots respective desired power levels,
- a control unit, operable to derive for the spectral slots respective attenuation values, using the measured power levels, the distribution data and the power level data,
- and one or more attenuators, operable to attenuate the optical transmission signal within the spectral slots individually, using the derived attenuation values.

DESCRIPTION OF EMBODIMENTS

As previously described with regard to FIG. 1, the prior art teaches to distribute subcarrier signals C1, C2 onto spectral slots S1, . . . , S12, such that a spectral slot is occupied by at most one subcarrier signal. This is the state of the art method known as the so called flex grid technology. The capability of equalization inside a super-channel signal formed by the subcarrier signals C1, C2 depends on the granularity of the spectral width of the used equalizers. These days equalizers are realised by the use of wavelength selective switches (WSS), which have a spectrum granularity of for example, 12.5 GHz.

Known equalization methods for subcarrier signals such as C1 and C2 rely on the assumption that a spectral slot is occupied by at most one subcarrier signal.

The method and the network node proposed herein allows to form a super-channel signal consisting of a number of subcarrier signals, wherein the bandwidth of a subcarrier signal does not have to be an integer multiple of the slot bandwidth, and wherein a spectral slot of the grid may be occupied by more than one carrier signal. This will be described in detail further below.

Figure 2:
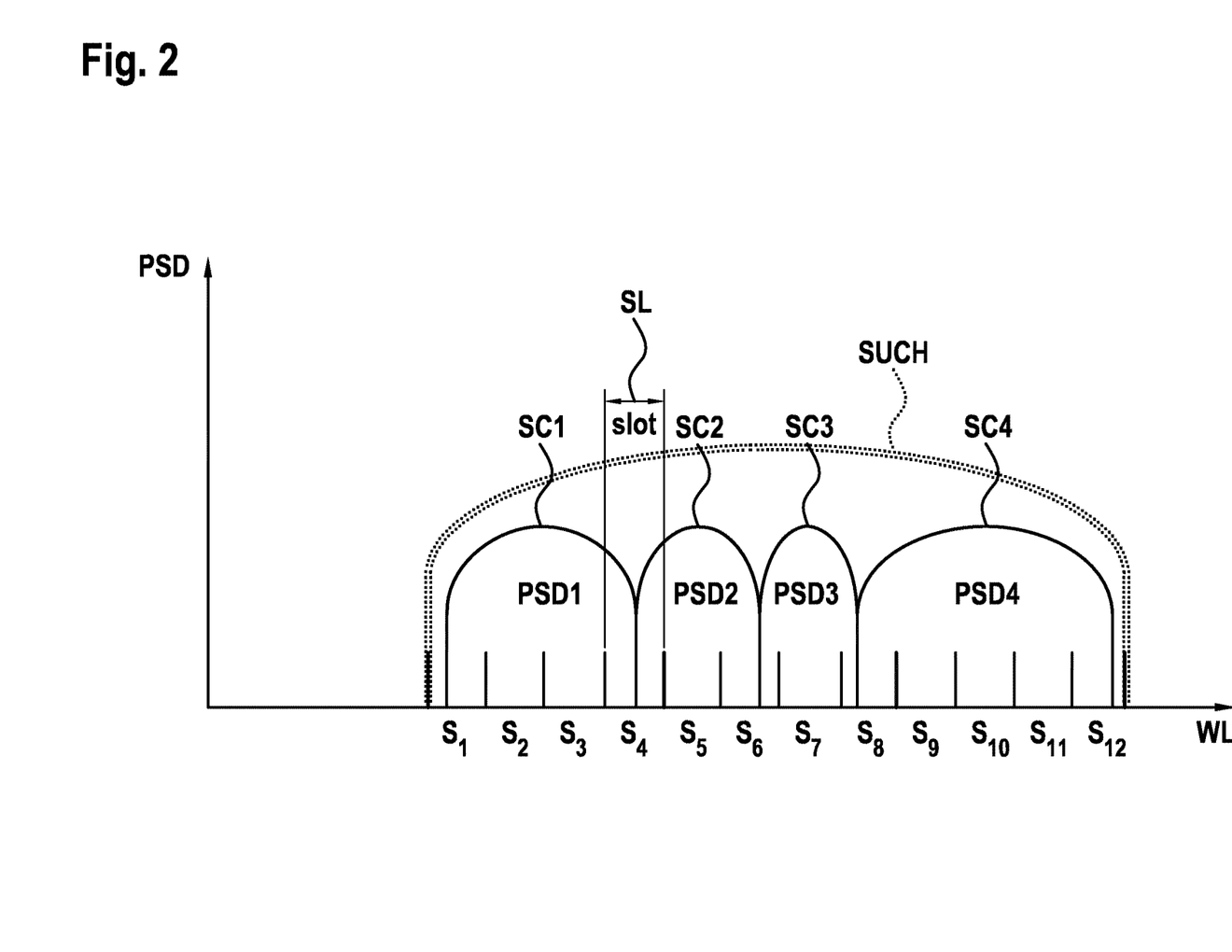
FIG. 2 shows a distribution of carrier signals onto spectral slots according to the proposed method.

FIG. 2 shows power spectral densities PSD over the wavelength WL for different subcarrier signals SC1, SC2, SC3, SC4 forming a super-channel signal SUCH. The definition of a super-channel signal is as given previously within the background section of this application.

It has to be noted, that different slots, such as the slot S4, the slot S6 and the slot S8, are occupied by more than one subcarrier signal. The carrier signals SC1, . . . , SC4 have respective power spectral densities PSD1, . . . , PSD4 as indicated in FIG. 2.

The proposed method described herein allows an equalization of the different carrier signals SC1, . . . , SC4 at an intermediate network node or a transmitting network node. This method of equalization is carried out, by applying to the super-channel signal respective equalization values for the respective slots S1, . . . , S12. The equalization values are preferably attenuation values.

Although the different carrier signals SC1, . . . , SC4 form a super-channel signal SUCH that is transmitted along a same optical link, the variations of the different optical channel attenuations affecting the different carrier signals SC1, . . . , SC4 differently may urge a need for individual equalization of the different carrier signals in terms of power equalization. An equalization applying same equalization values for all spectral slots forming the super-channel signal SUCH may not be sufficient.

Choosing an allocation of subcarrier signals SC1, . . . , SC4 onto the different slots S1, . . . , S12, as shown in FIG. 2, with a possible allocation of two carrier signals to a same slot may be beneficial in order to maximise the spectrum efficiency along the super-channel signal. This in turn avoids the use of fixing subcarrier signals to slots of a unique channel spacing grid. The fact that the different carrier signals SC1, . . . , SC4 are not exactly aligned on the grid is not an issue in coherent detection, since coherent detection allows a receiving side to selectively receive a specific subcarrier signal SC1, . . . , SC4 using a corresponding local oscillator signal.

The proposed method described now herein allows to perform an equalization in the optical domain, wherein a received optical signal does not have to be measured in terms of power for each slot individually, but only a power value per subcarrier signal has to be measured at the node performing the proposed method.

All that has to be known at the node carrying out the proposed method is the measured power values of the subcarrier signals, a distribution of the subcarrier signals onto the spectral slots and desired predefined power levels for the respective spectral slots.

The relationship between the carrier signals SC1, . . . , SC4 and the slots S1, . . . , S12 can be described as follows:

the super-channel signal SUCH is formed by a number of subcarrier signals SC1, . . . , SC4 with their respective index i as i=1 . . . M, e.g. M=4.

The subcarrier signals SC1, . . . , SC4 are distributed onto spectral slots S1, . . . , S12 with their respective index j as j=1 . . . N, e.g. N=12.

Preferably, a spectral slot has a bandwidth of 12.5 GHz.

Yielding the integral value along the power spectral density PSD1 of the carrier signal SC1, a respective power value P_1 may be derived. Thus, by deriving respective power values P_i for the respective carrier signals SC1, . . . , SC4, a power level vector $$\underline{P} = \begin{bmatrix} P_1 \\ \vdots \\ P_M \end{bmatrix}$$

of the size M×1 may be determined.

Similarly, by yielding the integral of the power spectral density of the slot S1, a respective power level value SP_1 may be derived. Thus, respective slot power values SP_1, . . . , SP_12 may be derived in order to determine the power level vector $$\underline{SP} = \begin{bmatrix} SP_1 \\ \vdots \\ SP_N \end{bmatrix}$$

of the size N×1, which indicates for the spectral slots S1, . . . , S12 respective power levels.

A coefficient $a_{j,i}$ indicates a contribution of the power of the subcarrier with the index i onto the slot with the index j. Such distribution coefficients can be summarised in a matrix $$\underline{A} = \begin{bmatrix} A_{j=1,i=1} & \cdots & A_{j=1,i=M} \\ \vdots & \ddots & \vdots \\ A_{j=N,i=1} & \cdots & A_{j=N,i=M} \end{bmatrix}$$

of the size N×M.

The relationship between the power levels of the subcarrier signals and the power levels for the different slots is then given by the equation $$\underline{SP} = \underline{A} \cdot \underline{P}.$$

In the example given by FIG. 2, this equation can be written as $$SP = \begin{pmatrix} SP_1 \\ SP_2 \\ SP_3 \\ SP_4 \\ SP_5 \\ SP_6 \\ SP_7 \\ SP_8 \\ SP_9 \\ SP_{10} \\ SP_{11} \\ SP_{12} \end{pmatrix} = \begin{pmatrix} a_{1,1} & 0 & 0 & 0 \\ a_{2,1} & 0 & 0 & 0 \\ a_{3,1} & 0 & 0 & 0 \\ a_{4,1} & a_{4,2} & 0 & 0 \\ 0 & a_{5,2} & 0 & 0 \\ 0 & a_{6,2} & a_{6,3} & 0 \\ 0 & 0 & a_{7,3} & 0 \\ 0 & 0 & a_{8,3} & a_{8,4} \\ 0 & 0 & 0 & a_{9,4} \\ 0 & 0 & 0 & a_{10,4} \\ 0 & 0 & 0 & a_{11,4} \\ 0 & 0 & 0 & a_{12,4} \end{pmatrix} \cdot \begin{pmatrix} P_1 \\ P_2 \\ P_3 \\ P_4 \end{pmatrix}.$$

The power SP_j within the slot with the index j is then given by $$SP_j = \sum_{i=1}^{M} a_{j,i} \cdot P_i.$$

The distribution of the carriers SC1, ..., SC4 onto the slots S1, ..., S12 is such, that a spectral slot is occupied by no carrier signal at all, only one carrier signal or two carrier signals. For example, the slot S1 is occupied by only the carrier signal SC1, such that the power within the slot 1 is given by $$SP_1 = a_{11} \cdot P_1.$$

For the slot S4, occupied by the carrier signals SC1 and SC2, the power level is determined by $$SP_4 = a_{41} \cdot P_1 + a_{42} \cdot P_2.$$

Looking at the relationships between the power levels for the different carrier signals, the power levels for the different slots and the matrix A, it becomes clear, that the matrix A indicates a pre-defined distribution of the subcarrier signals' respective power levels onto the spectral slots.

Assuming that, at an optical node, an optical signal is received and also amplified using an optical amplifier, then respective power levels for the respective carriers SC1, ..., SC4 may be measured at the receiving node after the amplifier. It may be determined, which respective attenuation values in terms of power attenuation have to be applied to the optical signal within the respective spectral slots in order to yield respective desired power levels for the respective slots. This can be achieved, by providing to the receiving node power level data indicating desired power levels for the slots S1, ..., S12 together with the matrix A as distribution data indicating a pre-defined distribution of the subcarrier signals' respective power levels onto the spectral slots.

The power level data indicating respective desired power levels Sd_i may be given by a vector $$\underline{Sd} = \begin{bmatrix} Sd_1 \\ \vdots \\ Sd_M \end{bmatrix}.$$

This power level data and the distribution data is either provided from an instance, such as a network management instance, knowing the distribution of the carrier signals power levels onto the slots and knowing the desired power levels. Alternatively, this power level data and the distribution data is determined by a transmitting network node that will be described in detail later on with regard to FIG. 4.

Figure 3:
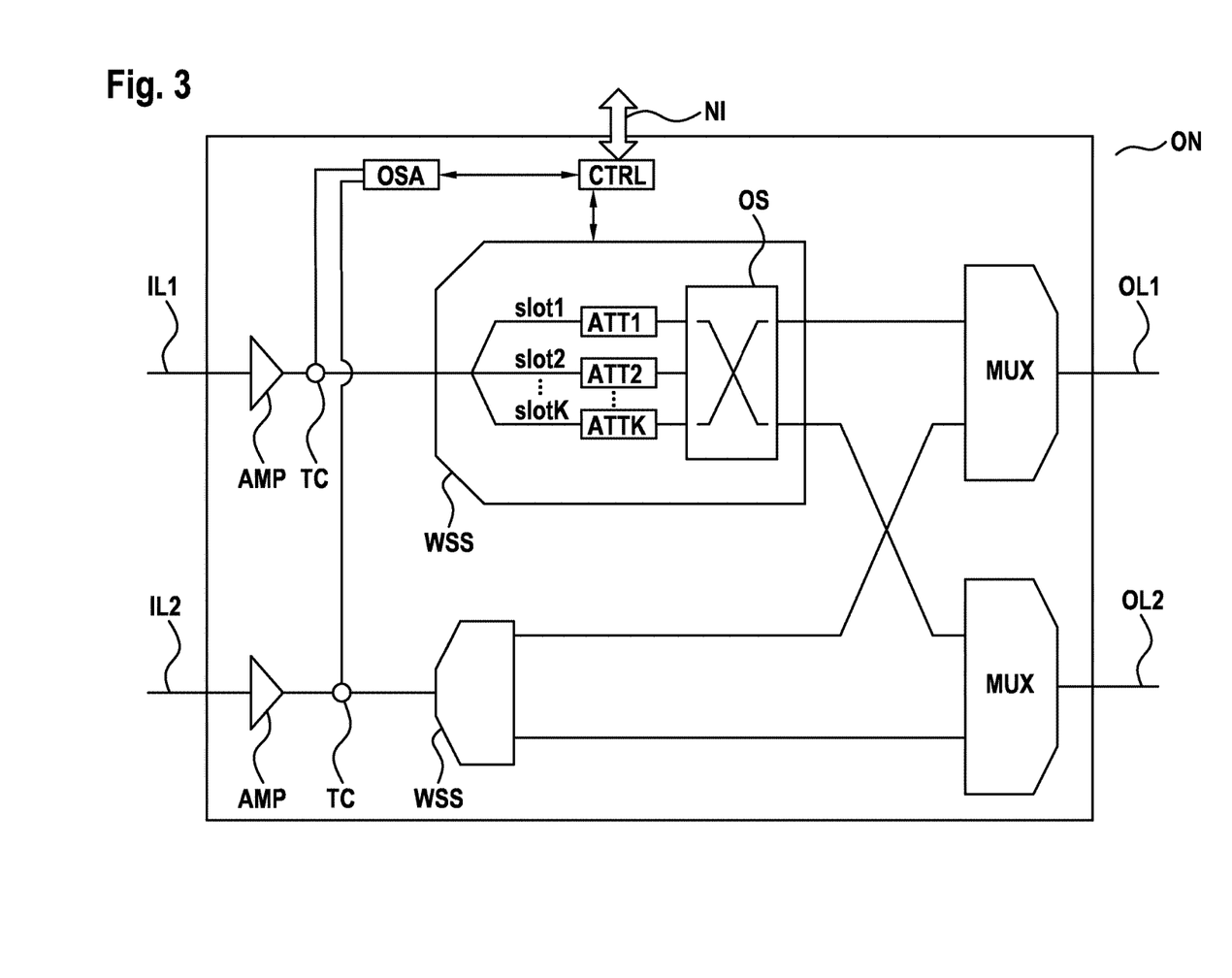
FIG. 3 shows a proposed optical network node.

The proposed method of equalizing an optical signal at a network node is now described in more detail with regard to FIG. 3.

FIG. 3 shows an optical network node ON, which contains a control unit CTRL, that is able to communicate with a network management instance via a network control plane using a network interface NI. The control plane may be for instance GMPLS based, wherein messages are sent via the RSVP or the OSPF protocol. Alternatively, the network control plane is a software network defined (SDN) based control plane. Via the control plane, the distribution data, indicating the distribution of the subcarrier signals onto the spectral slots in the form of preferably the matrix A, is received at the node ON. Furthermore, the power level data indicating for the spectral slots respective desired power levels, preferably in the form of the vector Sd, is received at the interface NI.

Optical signals may be received via the input links IL1, IL2 and may then be switched onto the output links OL1, OL2. This is achieved, by using at each input link IL1, IL2 a respective wavelength selective switch WSS, which in turn is connected to the respective multiplexing devices MUX of the output links OL1, OL2. Thus, the optical node ON forms an optical cross connecting node.

An optical signal received at an input link IL1, IL2 is amplified by a respective optical amplifier AMP and then provided to the respective wavelength selective switch WSS. A portion of the amplified signal is coupled out at a tap coupler TC and then provided to an optical spectrum analyzer OSA, which is preferably a grating based optical spectrum analyzer. The analyzer OSA is controlled by the controller CTRL. The analyzer OSA measures for a received optical signal, for example received at the input link IL1, respective power levels Pm_i of the respective carrier signals forming the super-channel signal. These power levels Pm_i are then provided to the control unit CTRL. The control unit CTRL controls attenuation devices ATT1, ..., ATTK of the wavelength selective switch WSS for applying respective attenuation values, which are attenuation values for power attenuation. Preferably, the number of attenuators K is equal to or greater than the number N of the considered spectral slots to which carrier signals forming a super-channel signal are allocated.

The different partial optical signals of the respective spectral slots are switched within the wavelength selective switch WSS by an optical switch OS onto one of the multiplexing devices MUX. Once the control unit CTRL has at hand measured respective power levels Pm_i of respective carrier signals SC1, ..., SC4, the control unit CTRL uses the provided distribution data indicating the distribution of subcarrier signals onto the spectral slots, given by the matrix A. Furthermore, the control unit CTRL uses the power level data indicating for the spectral slots respective desired power levels, preferably given by the vector Sd.

The measured respective power levels Pm_i of the subcarrier signals may be given by $$\underline{P_m} = \begin{bmatrix} Pm_1 \\ \vdots \\ Pm_M \end{bmatrix}.$$

Using the measured power levels and the provided distribution data, the control unit CTRL may compute measured power levels S_m for the respective slots as $$\underline{S_m} = \underline{A} \cdot \underline{P_m} \text{ with } \underline{S_m} = \begin{bmatrix} Sm_1 \\ \vdots \\ Sm_N \end{bmatrix}.$$

The measured power Sm_j of each slot with index j can differ from the desired or expected corresponding power levels Sd_j due to different attenuation effects and/or due to differences in the transmission properties of the optical path connecting the different transponders along which the super-channel signal is transmitted. Such attenuations may be due to fibre and/or connector disparities.

Using the provided power level data Sd indicating for the spectral slots respective desired power levels, the control unit CTRL may derive attenuation values S_eq as $$\underline{S_{eq}} = \begin{bmatrix} Seq_1 \\ \vdots \\ Seq_M \end{bmatrix} \text{ via } \underline{S_{eq}} = \underline{Sd} \cdot / \underline{S_m}.$$

Herein, the operation ./ denotes an element-wise division.

In other words, using the measured power levels Pm_i and the distribution data A together with the power level data Sd for the spectral slots, the attenuation values S_eq are derived.

Applying the achieved attenuation values S_eq, these values may then be used by the control unit CTRL for setting corresponding equalization values within the attenuators ATT1, ..., ATTK of the wavelength selective switch WSS. In other words, the optical transmission signal is attenuated within the spectral slots individually using the derived attenuation values Seq.

Preferably, the optical amplifiers AMP are not placed in front of the wavelength selective switches WSS and in front of the analyzer OSA, but at the output ports of the node ON, wherein the gain values of the amplifiers are taken into consideration for deriving the attenuation values of the attenuators ATT1, ..., ATTK.

In the specification as given above it has been assumed, that the distribution data, matrix A, indicating the distribution of the different subcarrier signals onto the spectral slots, and that the desired power level data, given by the vector Sd, may be know per se. With regard to FIG. 4 it is now described a network node ON1, which is operable to determine the distribution data and the power level data. The node ON1 may be a transmitting network node.

Figure 4:
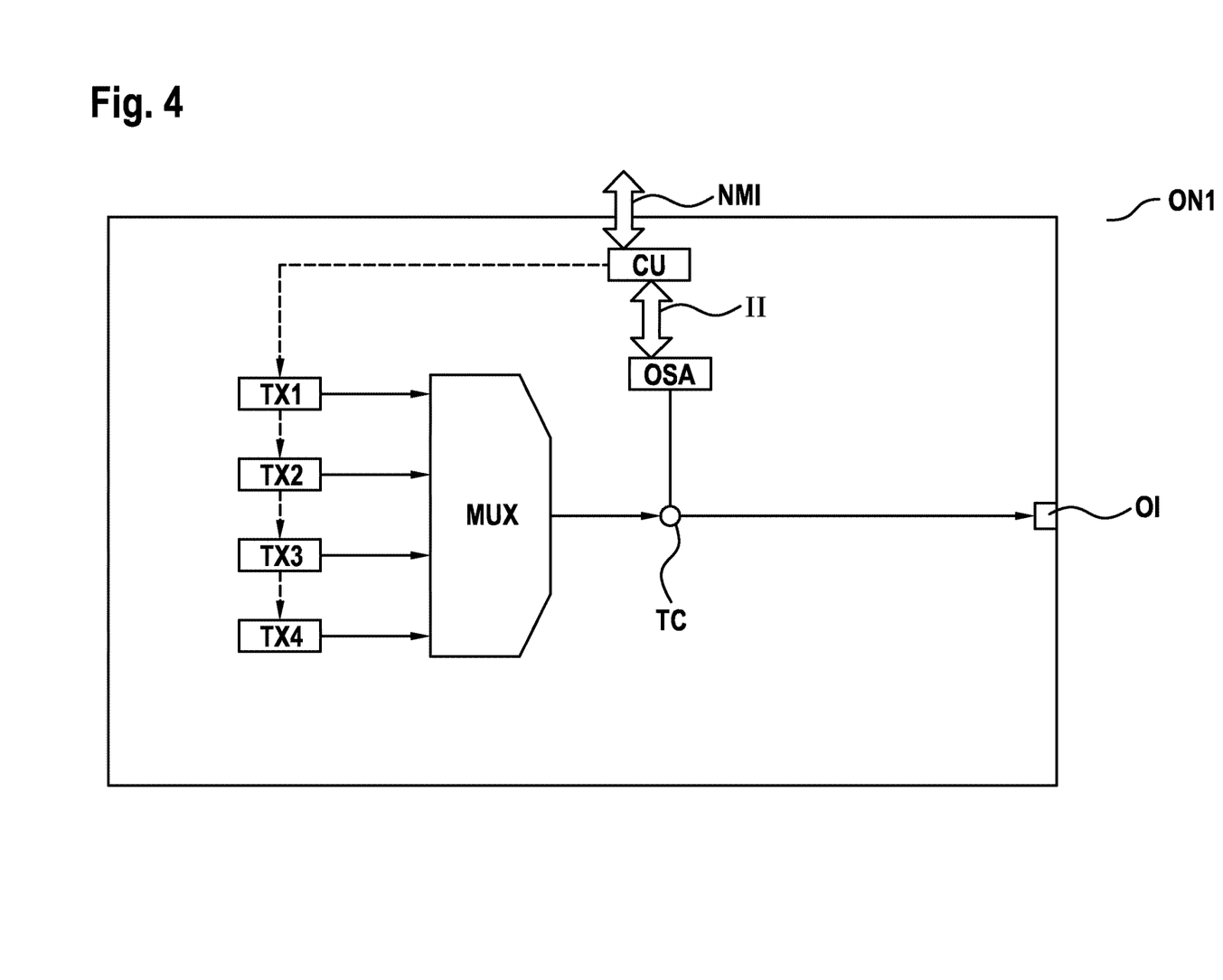
FIG. 4 shows a proposed transmitting optical network node that is operable to determine distribution data indicating a distribution of subcarrier signals onto spectral slots and operable to determine power level data indicating for the spectral slots respective desired power levels.

The node ON1 generates the super-channel signal SUCH of FIG. 2 and is furthermore able to derive the distribution data, matrix A, and the power level data, vector Sd, indicating for the spectral slots respective desired power levels.

In order to derive the needed distribution data and the power level data, the node ON1 has a control unit CU, which carries out the following steps.

The control unit CU instructs respective transmitters TX1, ..., TX4 to generate the carrier signals SC1, ..., SC4, shown in FIG. 2, with respective target power levels P_A, given as $$\underline{P_A} = \begin{bmatrix} PA_1 \\ \vdots \\ PA_M \end{bmatrix}.$$

Via a tap coupler TC an analyzer OSA measures for the different slots S1, ..., S12, as shown in FIG. 2, respective power levels S_A as $$\underline{S_A} = \begin{bmatrix} SA_1 \\ \vdots \\ SA_N \end{bmatrix}.$$

In a next step, new power levels P_B are set as $$\underline{P_B} = \begin{bmatrix} PB_1 \\ \vdots \\ PB_M \end{bmatrix},$$

wherein one or more power levels PB_i are varied, such that the vector P_B is not a linear combination of the vector P_A.

After setting the power levels to P_B, the analyzer OSA measures respective power levels S_B for the different slots as $$\underline{S_B} = \begin{bmatrix} SB_1 \\ \vdots \\ SB_N \end{bmatrix}.$$

The chosen power levels P_A and P_B lead to the relationships $$\underline{S_A} = \underline{A} \cdot \underline{P_A}$$

$$\underline{S_B} = \underline{A} \cdot \underline{P_B}$$

wherein this yields a set of 2N linearly independent equations. Due to the fact, that one spectral slot is occupied by at most two carrier signals, the number of unknown coefficients $a_{j,i}$ that have to be determined is maximally 2N. Thus, the obtained 2N linearly independent equations allow to determine the maximally 2N unknown coefficients $a_{j,i}$. Therefore, the matrix A as distribution data indicating the distribution of the subcarrier signals into the spectral slots, can be determined.

Having determined the matrix A as the distribution data and the vector S_A as the desired power level data, these two data sets can then be distributed via a network management interface NMI as previously described along a network management control plane either to a network management instance or to other nodes of the network, such as the node shown in FIG. 3.

It is to be noted, that the method proposed herein allows to equalize different carrier signals SC1, ..., SC4 of a super-channel signal SUCH, as shown in FIG. 2. A further step of equalizing the power levels of between different super-channels may follow afterwards. In the case that the power measurements described herein are carried out by devices having absolute power calibration and attenuations performed by devices with same specifications at each node, only the described step of subcarrier equalization within a super-channel signal would be sufficient in order to equalize a whole super-channel also in its absolute power. But in a real system this may not be the case. The analyzers OSA of different nodes may not be absolutely calibrated and different wavelength selective switches may have different specifications. Therefore, the total power of a super-channel signal may differ from the expected one on the line. Thus, equalization of absolute power between the different super-channel signals may be necessary.

The functions of the various elements shown in the FIGS. 3 and 4, including any functional blocks named or labelled as 'processor' or 'control unit', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. It should be appreciated by those skilled in the art that any block diagrams herein represent conceptual views of illustrative circuitry embodying the principles of the invention.

The invention claimed is:

1. Method of equalizing an optical transmission signal,
   wherein said optical transmission signal (SUCH) has an overall bandwidth formed on a number of adjacent spectral slots,
   wherein said optical transmission signal (SUCH) comprises a set of non-overlapping subcarrier signals (SC1, SC2, SC3, SC4),
   wherein a distribution of said subcarrier signals (SC1, SC2, SC3, SC4) onto said spectral slots is such, that at least one spectral slot (S4, S6, S8) is occupied by more than one subcarrier signal,
   comprising, at a network node (ON),
     receiving said optical transmission signal,
     amplifying said optical transmission signal,
     measuring for the subcarrier signals respective power levels,
     providing distribution data indicating said distribution of said subcarrier signals onto said spectral slots,
     providing power level data indicating for said spectral slots respective desired power levels,
     deriving for said spectral slots respective attenuation values, using the measured power levels, said distribution data and said power level data,
     attenuating said optical transmission signal within said spectral slots individually, using the derived attenuation values.

2. Method according to claim 1,
   wherein said distribution data indicates a predefined distribution of the subcarrier signals' respective power levels onto said spectral slots.

3. Method according to claim 1,
   wherein said optical transmission signal (SUCH) is a super-channel signal formed by said subcarrier signals (SC1, SC2, SC3, SC4).

4. Method according to claim 1,
   wherein said spectral slots have same respective bandwidths.

5. Network node of equalizing an optical transmission signal,
   wherein said optical transmission signal (SUCH) has an overall bandwidth formed on a number of adjacent spectral slots,
   wherein said optical transmission signal (SUCH) comprises a set of non-overlapping subcarrier signals (SC1, SC2, SC3, SC4),
   wherein a distribution of said subcarrier signals (SC1, SC2, SC3, SC4) onto said spectral slots is such, that at least one spectral slot (S4, S6, S8) is occupied by more than one subcarrier signal,
   wherein the node comprises
     an optical interface, operable to receive said optical transmission signal,
     an optical amplifier, operable to amplify said optical transmission signal,
     an optical spectrum analyzer (OSA), operable to measure for the subcarrier signals respective power levels,
     a network interface (NI), operable to provide distribution data indicating said distribution of said subcarrier signals onto said spectral slots, and furthermore operable to provide power level data indicating for said spectral slots respective desired power levels,
     a control unit (CU), operable to derive for said spectral slots respective attenuation values, using the measured power levels, said distribution data and said power level data,
     and one or more attenuators (ATT1, . . . , ATTK), operable to attenuate said optical transmission signal within said spectral slots individually, using the derived attenuation values.

6. Node according to claim 5,
   wherein said distribution data indicates a predefined distribution of the subcarrier signals' respective power levels onto said spectral slots.

7. Node according to claim 5,
   wherein said optical transmission signal (SUCH) is a super-channel signal formed by said subcarrier signals (SC1, SC2, SC3, SC4).

8. Node according to claim 5,
   wherein said spectral slots have same respective bandwidths.

* * * * *